US009469176B2

(12) United States Patent
Boyer et al.

(10) Patent No.: US 9,469,176 B2
(45) Date of Patent: Oct. 18, 2016

(54) SYSTEM AND METHOD TO DETECT AN UNATTENDED OCCUPANT IN A VEHICLE AND TAKE SAFETY COUNTERMEASURES

(71) Applicant: DELPHI TECHNOLOGIES, INC., Troy, MI (US)

(72) Inventors: Richard J. Boyer, Mantua, OH (US); John F. Heffron, Youngstown, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/592,408

(22) Filed: Jan. 8, 2015

(65) Prior Publication Data

US 2016/0200168 A1   Jul. 14, 2016

(51) Int. Cl.
| | |
|---|---|
| *B60H 1/00* | (2006.01) |
| *H04R 19/04* | (2006.01) |
| *G10K 11/18* | (2006.01) |
| *B60Q 5/00* | (2006.01) |

(52) U.S. Cl.
CPC .......... *B60H 1/00742* (2013.01); *B60Q 5/005* (2013.01); *G10K 11/18* (2013.01); *H04R 19/04* (2013.01); *H04R 2410/00* (2013.01)

(58) Field of Classification Search
CPC .......... B60H 1/00742; B60H 1/00757; B60H 1/00807; B60H 1/00814; B60H 1/00821; B60Q 5/00; B60Q 5/005; G10K 11/18; H04R 19/00; H04R 19/04; H04R 2410/00
See application file for complete search history.

(56) References Cited

U.S. PATENT DOCUMENTS

| | | | | |
|---|---|---|---|---|
| 6,012,006 A * | 1/2000 | Ohneda | ............. | B60R 21/01536 180/272 |
| 6,263,272 B1 | 7/2001 | Liu et al. | | |
| 6,304,179 B1 * | 10/2001 | Lotito | ................... | G01C 7/521 280/728.1 |
| 7,823,972 B2 | 11/2010 | Browne et al. | | |
| 9,240,176 B2 * | 1/2016 | Tzirkel-Hancock | . | G10K 11/002 |
| 2001/0048749 A1 * | 12/2001 | Ohmura | ................... | H04B 1/20 381/86 |
| 2002/0161501 A1 * | 10/2002 | Dulin | ................... | B06B 1/0215 701/45 |
| 2004/0240676 A1 * | 12/2004 | Hashimoto | .............. | H04R 5/02 381/56 |
| 2008/0055548 A1 * | 3/2008 | Matsuzawa | ........... | B06B 1/0603 353/15 |
| 2008/0103660 A1 * | 5/2008 | Browne | .............. | B60R 25/1004 701/46 |
| 2009/0046538 A1 * | 2/2009 | Breed | ..................... | B60C 11/24 367/93 |
| 2009/0204297 A1 * | 8/2009 | Friedman | ........... | B60H 1/00642 701/46 |
| 2012/0232749 A1 | 9/2012 | Schoenberg et al. | | |
| 2014/0266694 A1 | 9/2014 | McCluskey et al. | | |

(Continued)

FOREIGN PATENT DOCUMENTS

WO    2009144687 A2    12/2009

*Primary Examiner* — Jerrah Edwards
*Assistant Examiner* — Tamara Weber
(74) *Attorney, Agent, or Firm* — Robert J. Myers

(57) ABSTRACT

A safety system and a method configured to determine whether a passenger compartment of a vehicle is occupied whether the temperature of the passenger compartment is outside an acceptable temperature range, and to take a safety countermeasure if needed. An occupant is detected by sounds received by an audio transducer within the passenger compartment connected to an infotainment system. The temperature is detected by a temperature sensor connected to the heating, ventilation and air condition system of the vehicle. Example safety countermeasures include activating the horn, transmitting a wireless signal indicating that an unattended occupant is in the vehicle to a remote wireless receiver, and/or at least partially opening a vehicle window. A pair of high frequency speakers connected to the infotainment system may be used to transmit and receive ultrasonic signals so that an occupant may be detected using ultrasonic motion detection techniques.

18 Claims, 5 Drawing Sheets

(56) References Cited

U.S. PATENT DOCUMENTS

| | | | | |
|---|---|---|---|---|
| 2015/0094914 A1* | 4/2015 | Abreu | ................ | B60H 1/00742 701/41 |
| 2015/0137962 A1* | 5/2015 | Binnicker | ................ | B60Q 9/00 340/457 |
| 2015/0228172 A1* | 8/2015 | DeZur-Ahola | ........... | B60N 2/00 340/522 |

* cited by examiner

SYSTEM AND METHOD TO DETECT AN UNATTENDED OCCUPANT IN A VEHICLE AND TAKE SAFETY COUNTERMEASURES

TECHNICAL FIELD OF THE INVENTION

The invention relates to safety devices capable of detecting an unattended occupant, such as child or pet, within a vehicle and more particularly to safety systems capable of taking safety countermeasures if an unattended child is detected.

BACKGROUND OF THE INVENTION

When infants, children, or pets are left unattended in a passenger compartment of a closed vehicle with a high sun load for a period of time, the temperature within the passenger compartment may increase, causing heatstroke symptoms that may result in serious injury or death. Since 1998, the Department of Meteorology & Climate Science at San Jose State University documented an average of thirty eight child heatstroke fatalities occurring in vehicles in the United States each year. Similarly, infants, children, or pets left unattended in the passenger compartment of a vehicle in a cold climate for a period of time could experience temperatures low enough to cause harmful conditions such as hypothermia or frostbite. Therefore, a system that can detect an unattended child or pet in a passenger compartment of a vehicle and automatically take safety countermeasures is desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a vehicle safety system is provided. The vehicle safety system includes an inside air temperature (IAT) sensor that is disposed within a passenger compartment of a vehicle and is in electronic signal communication with a heating, ventilation, and air conditioning (HVAC) controller disposed within the vehicle. The IAT sensor is configured to provide an IAT sensor signal. The vehicle safety system also includes an audio transducer that is disposed within the passenger compartment and is in electronic signal communication with an infotainment system disposed within the vehicle. The audio transducer configured to provide an audio signal. The vehicle safety system further includes a safety controller that is in electronic signal communication with the IAT sensor, the infotainment system, and various vehicle controllers. The safety controller has non-volatile memory containing instructions that, when executed, cause the safety controller to monitor the audio signal and the IAT sensor signal, determine whether an occupant is in the vehicle based on the audio signal, determine whether a value of the IAT sensor signal deviates from an acceptable temperature range, and transmit a command to at least one of the various vehicle controllers to perform a safety countermeasure when the safety controller determines that the vehicle is occupied and the value of the IAT sensor signal is outside the acceptable temperature range. The audio transducer may be a microphone or a speaker.

In the case wherein the audio transducer is a speaker, the vehicle safety system may include a first and second high frequency speaker. The non-volatile memory of the vehicle safety controller further contains instructions that, when executed, cause the safety controller to transmit a first command to the infotainment system to generate a first ultrasonic signal via the first high frequency speaker while the second high frequency speaker provides a first audio signal based on the first ultrasonic signal, transmit a second command to the infotainment system to generate a second ultrasonic signal via the second high frequency speaker while the first high frequency speaker provides a second audio signal based on the second ultrasonic signal, and then determine whether an occupant is in the vehicle based on a comparison of the first and second audio signals.

One of the various vehicle controllers may be a vehicle body controller that is configured to activate a horn disposed within the vehicle. In this case, the non-volatile memory of the vehicle safety system further contains instructions that, when executed, cause the safety controller to transmit a command to the vehicle body controller to activate the horn when the safety controller determines that the vehicle is occupied and the value of the TAT sensor signal is outside the acceptable temperature range.

One of the various vehicle controllers may be an inflatable restraint controller that is in electronic signal communication with a driver seat sensor that is configured to determine if a driver seat is occupied by a driver. In this case, the non-volatile memory of the vehicle safety system further contains instructions that, when executed, cause the safety controller to determine whether the driver seat is occupied by the driver based on an output of the inflatable restraint controller and transmit a command to at least one of the various vehicle controllers to perform a safety countermeasure when the safety controller determines that the vehicle is occupied, the driver seat is unoccupied, and the value of the TAT sensor signal is outside the acceptable temperature range.

The infotainment system may include telematics capability. In this case, the non-volatile memory of the vehicle safety system further contains instructions that, when executed, cause the safety controller to transmit a command to the infotainment system to transmit a wireless signal indicating that an unattended occupant is in the vehicle to a remote receiver when the safety controller determines that the vehicle is occupied and the value of the TAT sensor signal is outside the acceptable temperature range.

In addition, one of the various vehicle controllers may be an inflatable restraint controller in electronic signal communication with a driver seat sensor configured to determine if a driver seat is occupied by a driver. In this case, the non-volatile memory of the vehicle safety system further contains instructions that, when executed, cause the safety controller to determine whether the driver seat is occupied by the driver based on an output of the inflatable restraint controller transmit a command to the infotainment system to transmit the wireless signal indicating that the unattended occupant is in the vehicle to the remote receiver when the safety controller determines that the vehicle is occupied, the driver seat is unoccupied, and the value of the TAT sensor signal is outside the acceptable temperature range.

One of the various vehicle controllers may be a window actuator that is configured to open a vehicle window. The window actuator is in electronic signal communication with a window controller. In this case, the non-volatile memory of the vehicle safety system further contains instructions that, when executed, cause the safety controller to transmit a command to the window controller to at least partially open the vehicle window when the safety controller determines at least that the vehicle is occupied and the value of the IAT sensor signal is greater than the acceptable temperature range, thereby reducing a temperature in the passenger compartment.

One of the various vehicle controllers may be an engine controller that is configured to start and run an engine disposed within the vehicle for a predetermined period of time. In this case, the non-volatile memory of the vehicle safety system further contains instructions that, when executed, cause the safety controller to transmit a first command to the engine controller to start and run the engine and transmit a second command to the HVAC controller to cool the passenger compartment when the safety controller determines that the vehicle is occupied and the value of the IAT sensor signal is greater than the acceptable temperature range, thereby reducing a temperature in the passenger compartment. The non-volatile memory may also contain instructions that, when executed, cause the safety controller to transmit a first command to the engine controller to start and run the engine and transmit another command to the HVAC controller to heat the passenger compartment when the safety controller determines that the vehicle is occupied and the value of the IAT sensor signal is less than the acceptable temperature range, thereby increasing a temperature in the passenger compartment.

The safety system may further comprise a sun load sensor that is in electronic signal communication with the HVAC controller. The sun load sensor is configured to provide a sun load sensor signal. In this case, the non-volatile memory of the safety system further contains instructions that, when executed, cause the safety controller to monitor the sun load sensor signal and transmit a command to at least one of the various vehicle controllers to perform a safety countermeasure when the safety controller determines that the vehicle is occupied, the value of the IAT sensor signal is outside the acceptable temperature range, and a value of the sun load sensor signal is less than a threshold voltage value.

The vehicle safety system may further include an outside air temperature (OAT) sensor that is in electronic signal communication with the HVAC controller. The OAT sensor is configured to provide an OAT sensor signal. In this case, the non-volatile memory of the vehicle safety system further contains instructions that, when executed, cause the safety controller to monitor the OAT sensor signal and transmit a command to at least one of the various vehicle controllers to perform a safety countermeasure when the safety controller determines that the vehicle is occupied, the value of the IAT sensor signal is outside the acceptable temperature range, and a value of the OAT sensor signal is outside an acceptable outside air temperature range.

In accordance with an embodiment of the invention, a method of taking safety countermeasures in a vehicle having various vehicle controllers, wherein an air temperature within a passenger compartment of the vehicle deviates from an acceptable temperature range is provided. The method includes the step of providing an IAT sensor disposed within the passenger compartment of the vehicle and in electronic signal communication with an HVAC controller disposed within the vehicle. The IAT sensor is configured to provide an IAT sensor signal. The method also includes the step of providing an audio transducer that is disposed within the passenger compartment and is in electronic signal communication with an infotainment system disposed within the vehicle. The audio transducer configured to provide an audio signal. The method further includes the steps of monitoring the audio signal and the IAT sensor signal, determining whether an occupant is in the vehicle based on the audio signal, determining whether a value of the IAT sensor signal deviates from the acceptable temperature range, and performing a safety countermeasure when it is determined that the vehicle is occupied and the value of the TAT sensor signal is outside the acceptable temperature range.

The method may further include the steps of providing a first and second high frequency speaker in electronic signal communication with the infotainment system, generating a first ultrasonic signal via the first high frequency speaker while the second high frequency speaker provides a first audio signal based on the first ultrasonic signal, generating a second ultrasonic signal via the second high frequency speaker while the first high frequency speaker provides a second audio signal based on the second ultrasonic signal and determining whether the occupant is in the vehicle based on a comparison of the first and second audio signals.

One of the various vehicle controllers may be a vehicle body controller configured to activate a horn disposed within the vehicle. In this case, the method further includes the step of activating the horn when it is determined that the vehicle is occupied and the value of the TAT sensor signal outside than the acceptable temperature range.

The infotainment system may include telematics capability. In this case, the method further includes the step of transmitting a wireless signal indicating that an unattended occupant is in the vehicle to a remote receiver when it is determined that the vehicle is occupied and the value of the TAT sensor signal is outside the acceptable temperature range. In addition, one of the various vehicle controllers may be an inflatable restraint controller that is in electronic signal communication with a driver seat sensor configured to determine if a driver seat is occupied by a driver. In this case, the method further includes the steps of determining whether the driver seat is occupied by the driver based on an output of the inflatable restraint controller and transmitting the wireless signal indicating that the unattended occupant is in the vehicle to the remote receiver when it is determined that the vehicle is occupied, the driver seat is unoccupied, and the value of the IAT sensor signal is outside the acceptable temperature range.

One of the various vehicle controllers may be a window controller that is in electronic signal communication with a window actuator configured to open a vehicle window. In this case, the method further includes the step of at least partially opening the vehicle window via the window actuator when it is determined that the vehicle is occupied and the value of the IAT sensor signal is greater than the acceptable temperature range, thereby reducing a temperature in the passenger compartment.

One of the various vehicle controllers may be an engine controller configured to start and run an engine disposed within the vehicle for a predetermined period of time. In this case, the method further includes the steps of starting and running the engine and cooling the passenger compartment when it is determined that the vehicle is occupied and the value of the IAT sensor signal is greater than the acceptable temperature range, thereby reducing a temperature in the passenger compartment. Alternatively or in addition, the method may further include the steps of starting and running the engine and heating the passenger compartment when it is determined that the vehicle is occupied and the value of the IAT sensor signal is less than the acceptable temperature range, thereby increasing a temperature in the passenger compartment.

The method may further include the step of providing a sun load sensor that is in electronic signal communication with the HVAC controller. The sun load sensor is configured to provide a sun load sensor signal. In this case, the method further includes the steps of monitoring the sun load sensor signal and transmitting a command to at least one of the various vehicle controllers to perform a safety countermeasure when it is determined that the vehicle is occupied, the value of the IAT sensor signal is outside the acceptable temperature range, and a value of the sun load sensor signal is less than a threshold voltage value.

The method may further include the step of providing an OAT sensor that is in electronic signal communication with the HVAC controller. The OAT sensor is configured to provide an OAT sensor signal. In this case, the method further includes the steps of monitoring the OAT sensor signal and transmitting a command to at least one of the various vehicle controllers to perform a safety countermeasure when it is determined that the vehicle is occupied, the value of the IAT sensor signal is outside the acceptable temperature range, and a value of the OAT sensor signal is outside an acceptable outside air temperature range.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Described herein is a vehicle safety system that is configured to detect an unattended child or pet in a passenger compartment of a vehicle wherein the temperature inside the passenger compartment is unsafe for continued exposure. The safety system is further configured to automatically take safety countermeasure, such as generate an alarm to alert a responsible authority and/or bring the temperature within the passenger compartment to a safer level. This safety system uses onboard sensors and transducers that are already installed in the vehicle and used by other vehicle systems. As a non-limiting example, many vehicles currently in production have a microphone connected to the vehicle's infotainment system that is used to support hands-free telephone use or receive voice commands. This microphone may be used by the safety system to monitor the passenger compartment for sounds that would indicate the presence of a child or pet. In addition, the heating ventilation and air conditioning (HVAC) system of the vehicle may include an inside air temperature (IAT) sensor that used to maintain a desired temperature within the passenger compartment. This IAT sensor may be used to detect when the air temperature inside the passenger compartment is outside of an acceptable range of temperatures and is capable of causing harm to an unattended child or pet. If an occupant is detected within the passenger compartment and the temperature inside passenger compartment is outside the bounds of an acceptable temperature range, the vehicle safety system may automatically take a safety countermeasure such as produce an alarm to alert a responsible authority by activation the vehicle's horn.

Alternatively, the vehicle safety system may use other sensors or transducers within the vehicle to detect the air temperature within the passenger compartment, detect the presence of an unattended pet or child, and automatically take a safety countermeasure.

Figure 1:
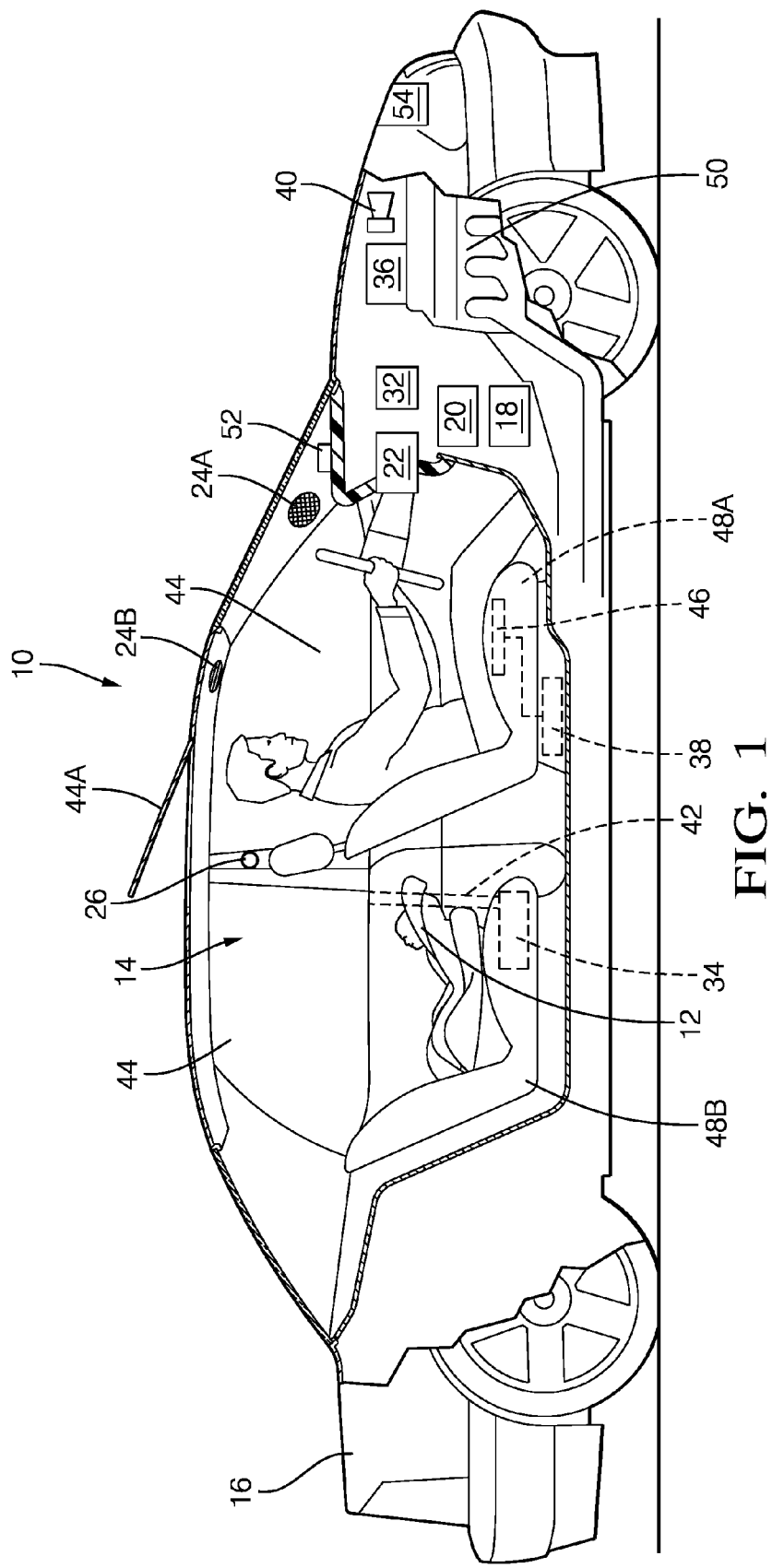
FIG. 1 is a schematic diagram of a safety system within a vehicle configured to determine whether the vehicle is occupied, determine whether the temperature within the vehicle is outside of a desired range, and perform a safety countermeasure according to one embodiment.

FIG. 1 illustrates an example of a vehicle safety system 10 that is configured to detect an unattended occupant 12, such as a child or a pet, in a passenger compartment 14 of a vehicle 16 and detect whether the temperature inside the passenger compartment 14 is outside of an acceptable temperature range. The vehicle safety system 10 is further configured to automatically take a safety countermeasure. The vehicle safety system 10 includes a safety controller 18 that is electrically connected and in electrical signal communication with various controllers and systems within the vehicle 16. These various controllers and systems include at least a heating, ventilation, and air conditioning (HVAC) controller 20 and an infotainment system 22 having at least one audio transducer 24, such as a speaker 24A or a microphone 24B.

The vehicle safety system 10 includes an inside air temperature (IAT) sensor 26 that is disposed within the passenger compartment 14 of the vehicle 16. The TAT sensor 26 is electrically connected to the HVAC controller 20. The TAT sensor 26 is configured to provide an electrical signal, hereinafter referred to as an TAT sensor signal, which is indicative of the air temperature within the passenger compartment 14. The TAT sensor 26 may be a thermistor that provides an TAT sensor signal in the form of a voltage level that is proportional to the inside air temperature of the passenger compartment to the HVAC controller 20. The HVAC controller 20 is configured to provide heated air, e.g. from a heater core (not shown) connected to the engine cooling system (not shown) of the vehicle 16, or cooled air, e.g. from an evaporator (not shown) connected to an air conditioning system (not shown) of the vehicle 16, to the passenger compartment 14 of the vehicle 16 based on the IAT sensor signal to create the desired temperature within the passenger compartment 14.

In the non-limiting example illustrated in FIG. 1, the HVAC controller 20 contains analog/digital (A/D) convertor circuitry (not shown) and the HVAC controller 20 transmits a digital representation of the IAT sensor signal to the safety controller 18 via a digital data bus (not shown), such as a controller area network (CAN) bus interconnecting the HVAC controller 20 and the safety controller 18. In an alternative embodiment, the HVAC controller 20 may transmit the IAT sensor signal to the safety controller 18 via an analog electrical interconnection. In yet another alternative embodiment, the IAT sensor 26 may be directly connected to the safety controller 18.

The audio transducer 24 is disposed within the passenger compartment 14 and is electrically connected and in electrical signal communication with the infotainment system 22 which is also disposed within the vehicle 16. As used herein, an infotainment system 22 provides audio information and/or entertainment to occupants within the passenger compartment 14. The audio sources may be radio (satellite or terrestrial), digital media playback (compact disk, streaming media), or other audio sources. The infotainment system 22 may also have communication capabilities, such as hands free cellular telephone connectivity or telematics (voice/data/location) connectivity.

According to the embodiment illustrated in FIG. 1, the audio transducer 24 is a speaker 24A configured to provide an audio signal based on an electrical signal from the infotainment system 22. As those skilled in the art are aware, a speaker provides an audio output when speaker cone is moved by an alternating electrical current of a signal flowing through a coil attached to the speaker cone that is exposed to a magnetic field. As those skilled in the art are also aware, the coil of the speaker may also generate an alternating electrical current signal proportional an audio input impacting the cone when the cone is moved by the audio signal. In this case, the speaker acts as a microphone. Alternatively, the audio transducer 24 may be a microphone 24B, e.g. a microphone used to support hands-free cellular telephone calls.

The audio signal from the speaker 24A may be transmitted from the infotainment system 22 to the safety controller 18 that is in electrical signal communication with the infotainment system 22. According to this non-limiting example, there is an analog communication channel (not shown) configured to transmit the audio signal as well as a digital bus connection configured to transmit data between the safety controller 18 and the infotainment system 22. In alternative embodiments, a digitized representation of the audio signal may be transmitted from the infotainment system 22 to the safety controller 18 via the digital data bus. The safety controller 18 includes audio signal processing circuitry (not shown) that is configured to determine whether an occupant 12 is in the passenger compartment 14 based on the audio signal from the audio transducer 24. According to the illustrated embodiment, the safety controller 18 includes A/D circuitry (not shown) and digital signal processing (DSP) circuitry (not shown) that is configured to analyze the audio signal from the audio transducer 24. The DSP circuitry analyzes the frequency content and duration of the audio signal and determines that an occupant 12 is in the passenger compartment 14 when the frequency content and duration match a predetermined profile. Alternatively, the safety controller 18 may have analog signal processing circuitry configured to perform this function. The safety controller 18 is also interconnected to the HVAC controller 20 and various other vehicle controllers, such as a body controller 32, window controller 34, engine controller 36, and/or inflatable restraint controller 38. Different embodiments of the safety controller may utilize other analysis techniques to determine whether a child or pet is in the passenger compartment.

The safety controller 18 may include a microprocessor, application specific integrated circuit (ASIC), or may be built from discrete logic and timing circuits (not shown). Software instructions that program safety controller 18 to control the vehicle safety system 10 may be stored in a non-volatile (NV) memory device (not shown). The NV memory device may be contained within the microprocessor or ASIC or it may be a separate device. Non-limiting examples of the types of NV memory that may be used include electrically erasable programmable read only memory (EEPROM), masked read only memory (ROM), and flash memory. The safety controller 18 may also include a digital data bus transceiver (not shown), such as a CAN bus transceiver, to allow the safety controller 18 to establish electrical communication with the HVAC controller 20, infotainment system 22, and various other vehicle controllers.

The NV memory of the safety controller 18 contains instructions that, when executed, cause the safety controller 18 to monitor the audio signal and the IAT sensor signal, determine whether an occupant 12 is in the vehicle 16 based on the audio signal, determine whether the IAT sensor signal deviates from an acceptable temperature range, i.e. is outside the acceptable temperature range (e.g. 10° C. to 25° C.), and transmit a command to at least one of the various vehicle controllers to perform a safety countermeasure when the safety controller 18 determines at least that the passenger compartment 14 is occupied and the TAT sensor signal is outside the acceptable temperature range.

According to the non-limiting example illustrated in FIG. 1, one of the various vehicle controllers is a body controller 32 in electronic signal communication with the safety controller 18 via the digital data bus. The body controller 32 is configured to activate a horn 40 disposed within the vehicle 16, typically in an under hood location so that the horn 40 may be easily heard outside of the vehicle 16. The NV memory of the safety controller 18 further contains instructions that, when executed, cause the safety controller 18 to determine at least that the passenger compartment 14 is occupied and that the value of the TAT sensor signal is outside the acceptable temperature range and cause the safety controller 18 to transmit a command via the digital data bus to the body controller 32 to activate (i.e. honk) the horn 40 to alert someone in the area of the vehicle 16 to the unattended occupant 12 in the passenger compartment 14. Activating the vehicle's horn 40 is a non-limiting example of a safety countermeasure.

According to the non-limiting example illustrated in FIG. 1, one of the various vehicle controllers is a window controller 34 that is in electronic signal communication with a window actuator 42 that is configured to open a window 44 in the vehicle 16. As used herein, a window 44 is any moveable panel, transparent or opaque that may be moved by the window actuator 42, such as an electrical motor drive. This definition of vehicle window includes, but is not limited to, side glass panels, rear glass panels, roof panels (e.g. sun roof 44A), and/or rear doors. The NV memory of the safety controller 18 further contains instructions that, when executed, cause the safety controller 18 to determine at least that the passenger compartment 14 is occupied and that the value of the TAT sensor signal is greater than, i.e. exceeds, the acceptable temperature range and cause the safety controller 18 to transmits a command via the digital data bus to the window controller 34 to instruct the window actuator 42 to at least partially open the window 44, thereby reducing a temperature in the passenger compartment 14. The window 44 may be only partially opened to provide some level of security to the occupant 12 and to prevent a child or pet from leaving the vehicle 16 via a fully open window. In vehicles equipped with a sun roof 44A, the windows 44 may be partially opened and the sun roof 44A may be fully opened to create convection currents that could help cool the passenger compartment 14 more rapidly. Opening a vehicle's window 44 is another non-limiting example of a safety countermeasure.

The infotainment system 22 may include telematics capability that provides the ability for the vehicle 16 to wirelessly communicate data as well as voice to a responsible party outside the vehicle 16, such as an attended call center (not shown), a key fob (not shown) carried by the vehicle's driver, or a predetermined cellular telephone (not shown). As a non-limiting example, the data transmitted can include GPS location as well as an indication that an unattended occupant 12 is inside the passenger compartment 14. In this case, the NV memory of the safety controller 18 further contains instructions that, when executed, cause the safety controller 18 to determine at least that the passenger compartment 14 is occupied and that the value of the IAT sensor signal is outside the acceptable temperature range and cause the safety controller 18 transmit a command via the digital data bus to the infotainment system 22 to send a wireless signal indicating that an unattended occupant 12 is in the vehicle 16 to a remote wireless receiver. Transmitting a wireless message from the vehicle is yet another non-limiting example of a safety countermeasure.

According to the non-limiting example illustrated in FIG. 1, one of the various vehicle controllers is an inflatable restraint controller 38 that is in electronic signal communication with a driver seat sensor 46 that is configured to determine if a driver seat 48A is occupied by a driver. The inflatable restraint controller 38 is also in electronic signal communication with the safety controller 18 via the digital data bus. The inflatable restraint controller 38 is configured determine whether the driver seat 48A is occupied by the driver based on an output of the inflatable restraint controller 38 and transmit that data to the safety controller 18 via the digital data bus. The NV memory of the safety controller 18 further contains instructions that, when executed, cause the safety controller 18 to determine that the passenger compartment 14 is occupied, that the driver seat 48A is unoccupied, and that the value of the TAT sensor signal is outside the acceptable temperature range. The NV memory of the safety controller 18 also contains instructions that, when executed, cause the safety controller 18 automatically take a safety countermeasure such as transmitting a command via the digital data bus to the body controller 32 to activate the horn 40 or transmit a command via the digital data bus to the infotainment system 22 to transmit a wireless signal indicating that an unattended occupant 12 is in the vehicle 16 to a remote wireless receiver (not shown).

The vehicle safety system 10 may also include other seat sensors (not shown) that are connected to the inflatable restraint controller 38 that are configured to detect occupants 12 in other seating locations within the passenger compartment 14. These other seat sensors may detect an occupant 12 of the front passenger's seat (not shown) or may detect occupants 12 in one of the rear passenger seats 48B. These passenger's seat sensors are typically used to determine whether to deploy an inflatable restraint for that particular location in the vehicle. A signal from one of these passenger's seat sensors may be used by the safety controller 18 in addition to audio signal from the audio transducer 24 to detect whether the passenger compartment 14 is occupied by an unattended occupant 12.

According to the non-limiting example illustrated in FIG. 1, one of the various vehicle controllers is an engine controller 36 that is configured to start and run an engine 50 disposed within the vehicle 16 for a predetermined period of time, e.g. 10 minutes. The NV memory of the safety controller 18 further contains instructions that, when executed, cause the safety controller 18 to determine that the passenger compartment 14 is occupied and that the value of the TAT sensor signal is greater than the acceptable temperature range indicating that the passenger compartment 14 is too hot. The NV memory of the safety controller 18 also contains instructions that, when executed, cause the safety controller 18 to transmits a first command to the engine controller 36 via the digital data bus to start and run the engine 50, enabling operation of the air conditioning compressor (not shown) and provide cooling from the HVAC system (not shown). The NV memory of the safety controller 18 additionally contains instructions that, when executed, cause the safety controller 18 to transmit a second command via the digital data bus to the HVAC controller 20 to configure the HVAC system to cool the passenger compartment 14, thereby reducing a temperature in the passenger compartment 14.

The NV memory of the safety controller 18 may further contain instructions that, when executed, cause the safety controller 18 to determine that the passenger compartment 14 is occupied and that the value of the TAT sensor signal is less than the acceptable temperature range indicating that the passenger compartment 14 is too cold and transmit a first command to the engine controller 36 via the digital data bus to start and run the engine 50, thus heating coolant in the engine 50 and enabling the HVAC system to provide heating to the passenger compartment 14. The NV memory of the safety controller 18 may also contains instructions that, when executed, cause the safety controller 18 to transmit a second command via the digital data bus to the HVAC controller 20 to configure the HVAC system to heat the passenger compartment 14, thereby increasing the temperature in the passenger compartment 14.

Some vehicles, such as electric or hybrid electric vehicles, have HVAC systems that are not dependent on an internal combustion engine to provide heating or cooling to the passenger compartment 14. In these vehicles, the safety controller 18 may command the HVAC system to provide heated or cooled air to the passenger compartment 14 without first starting an engine.

According to the non-limiting example illustrated in FIG. 1, the safety system 10 further comprises a sun load sensor 52 that is in electronic signal communication with the HVAC controller 20. The HVAC controller 20 is configured to provide a sun load sensor signal to the safety controller 18 via the digital data bus. Alternatively, the sun load sensor is also connected the safety controller and the safety controller received the sun load sensor signal directly from the sun load sensor. The sun load sensor may be integral to or separate from the IAT sensor. The sun load sensor 52 monitors the intensity of sunlight and the HVAC controller 20 adjusts operation based on the sun load sensor signal to improve the comfort level of the driver and passengers on sunny days. Typical sun load sensors are of the photodiode type, which provides increased electrical resistance as the light intensity increases, so the voltage of the sun load sensor signal is reduced as the sun shines brighter. The NV memory of the safety controller 18 further contains instructions that, when executed, cause the safety controller 18 to monitor the value of the sun load sensor 52 signal and transmit a command via the digital data bus to at least one of the various vehicle controllers to perform at least one safety countermeasure when the safety controller 18 determines that the passenger compartment 14 is occupied, the TAT sensor signal is outside the acceptable temperature range, and the value of the sun load sensor signal is less than a threshold voltage value.

According to the non-limiting example illustrated in FIG. 1, the vehicle safety system 10 further comprises an outside air temperature (OAT) sensor 54 in electronic signal communication with the HVAC controller 20. The OAT sensor may further be in communication with a body controller module (BCM) or an engine controller module (ECM). The OAT sensor 54 is located within the vehicle 16 but outside of the passenger compartment 14 and is configured to provide an electrical signal, hereinafter referred to as an OAT sensor signal that is indicative of the air temperature outside of the passenger compartment 14. The OAT sensor 54 may be a thermistor that provides an OAT sensor signal in the form of a voltage level that is proportional to the outside air temperature to the HVAC controller 20. The HVAC controller 20 is configured to provide an OAT sensor signal to the safety controller 18 via the digital data bus. Alternatively, the OAT sensor may be also connected directly to the safety controller and provide the OAT sensor 54 signal directly to the safety controller 18. The NV memory of the safety controller 18 further contains instructions that, when executed, cause the safety controller 18 to monitor the value of the OAT sensor signal and transmit a command via the digital data bus to at least one of the various vehicle controllers to perform at least one safety countermeasure when the safety controller 18 determines that the passenger compartment 14 is occupied, the TAT sensor signal is outside the acceptable temperature range, and the value of the OAT sensor signal is outside an acceptable outside air temperature range. Alternatively, when the value OAT sensor signal is less than the acceptable outside air temperature range, the safety countermeasure may be one to increase the temperature within the passenger compartment 14.

Figure 2A:
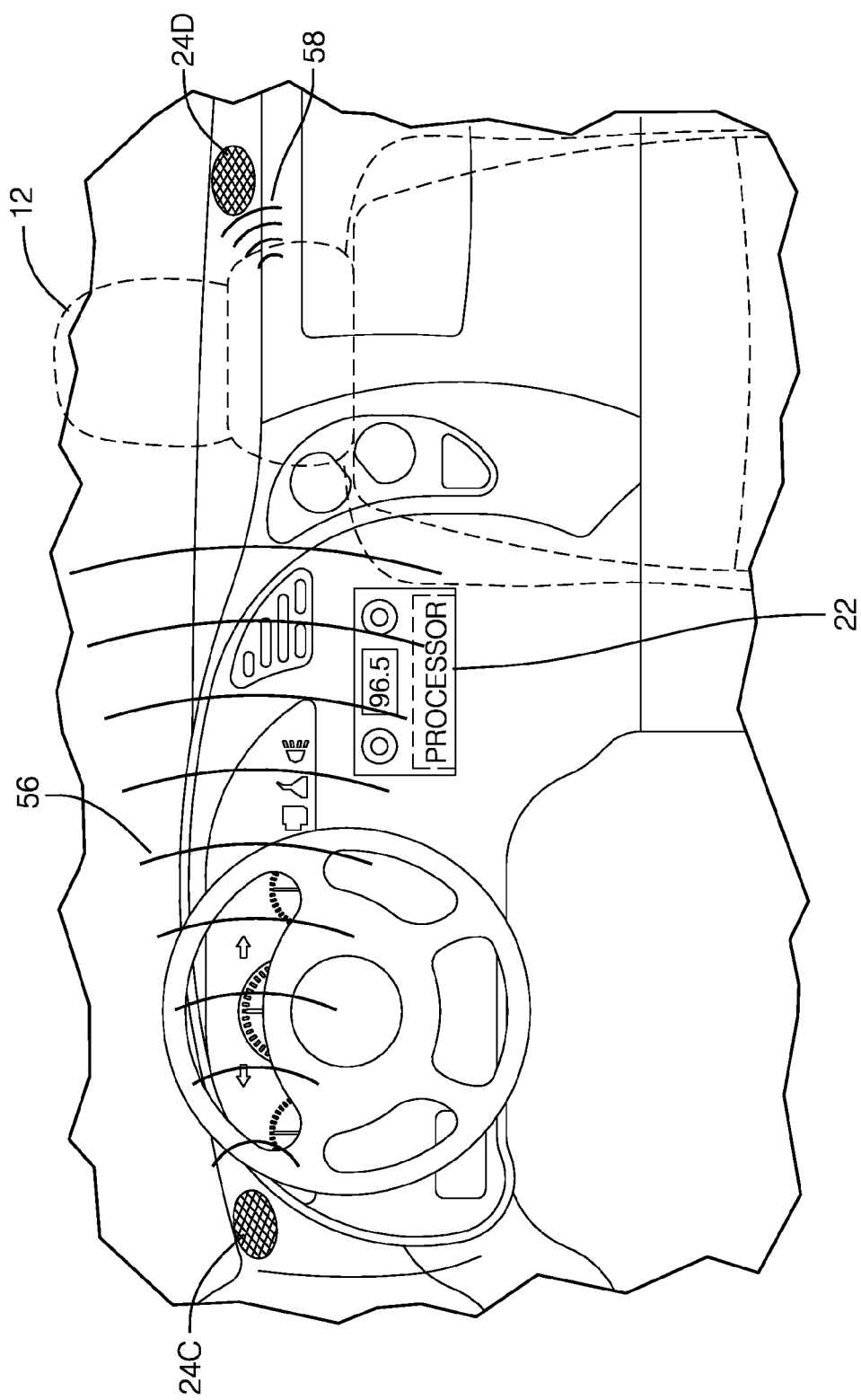
FIGS. 2A and 2B are schematic diagrams of a safety system within a vehicle configured to determine whether the vehicle is occupied by transmission of an ultrasonic signal by one audio transducer and the reception of the reflected ultrasonic signal by another audio transducer according to another embodiment.
Figure 2B:
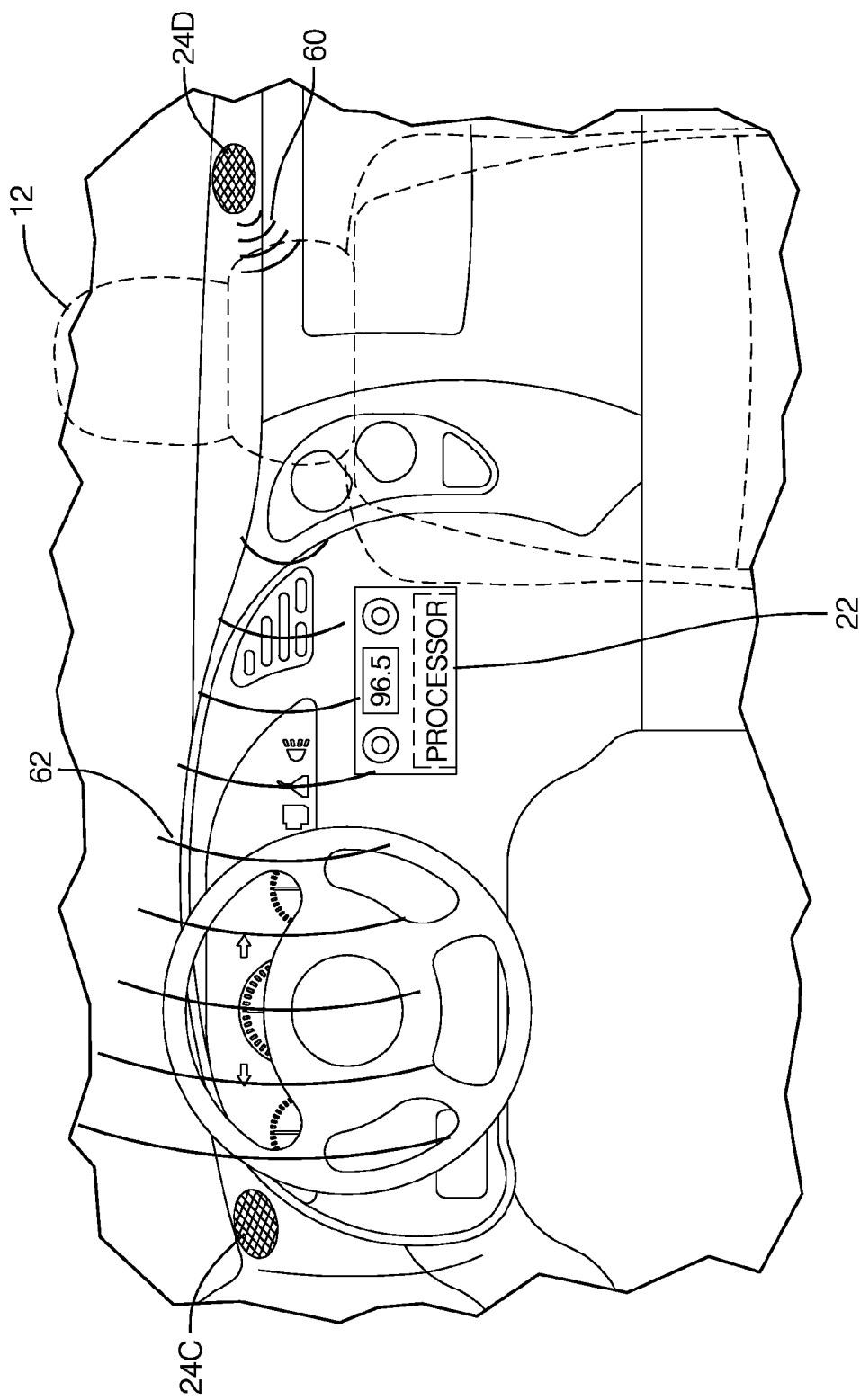

According to the non-limiting example illustrated in FIGS. 2A and 2B, the speaker 24A may be a pair of high frequency speakers 24C, 24D, commonly known as tweeters, which are configured to provide the high frequency audio signals from the infotainment system 22. The high frequency speakers 24C, 24D are typically located in the A pillar of the passenger compartment 14, but may be located in other locations within the passenger compartment 14. The frequency response of these high frequency speakers 24C, 24D may range from 10 kHz up to 50 kHz. These high frequency speakers 24C, 24D are used by the vehicle safety system 10 as ultrasonic motion detectors. The NV memory of the safety controller 18 further contains instructions that, when executed, cause the safety controller 18 to transmit a command to the infotainment system 22 to generate a first ultrasonic signal 56, typically in the range of 30 kHz to 50 kHz, via the first high frequency speaker 24C. The second high frequency speaker 24D then receives a reflection 58 of the first ultrasonic signal 56 and provides a first audio signal as illustrated in FIG. 2A. The NV memory of the safety controller 18 also contains instructions that, when executed, cause the safety controller 18 to transmit a command to the infotainment system 22 to generate a second ultrasonic signal 60 also in the range of 30 to 50 kHz via the second high frequency speaker 24D after the vehicle safety system 10 receives the first audio signal from the second high frequency speaker 24D. The first high frequency speaker 24C then receives a reflection 62 of the second ultrasonic signal 60 and provides a second audio signal as illustrated in FIG. 2B. The NV memory of the safety controller 18 further contains instructions that, when executed, cause the DSP of the vehicle safety system 10 to determine whether an occupant 12 is in the passenger compartment 14 based on movement detected by a comparison of the first and second audio signals using known ultrasonic motion detecting techniques after the vehicle safety system 10 receives the second audio signal from the second high frequency speaker 24D. The active detection of an occupant 12 using ultrasonic motion detection may be used in conjunction with the passive detection using audio signal frequency and duration analysis discussed previously or instead of this passive detection.

The safety controller 18 described herein may be a stand-alone device containing a dedicated microprocessor, NV memory, and digital communication bus. Alternatively, the safety controller may be a virtual controller wherein some or all of the functionality of the safety controller is partitioned and located in other controllers within the vehicle. For example, the NV memory of the HVAC controller may contain instructions that, when executed, cause the HVAC controller to determine if the value of the IAT sensor signal is outside of the acceptable inside air temperature range and/or the NV memory of a DSP within the infotainment system may contain instructions that, when executed, cause the DSP to analyze the audio signal to determine whether the vehicle is occupied. If the safety controller is implemented as a virtual controller, the vehicle safety system described herein could be added to an existing vehicle having all of the necessary hardware by updating the memory of the existing controllers.

Figure 3:
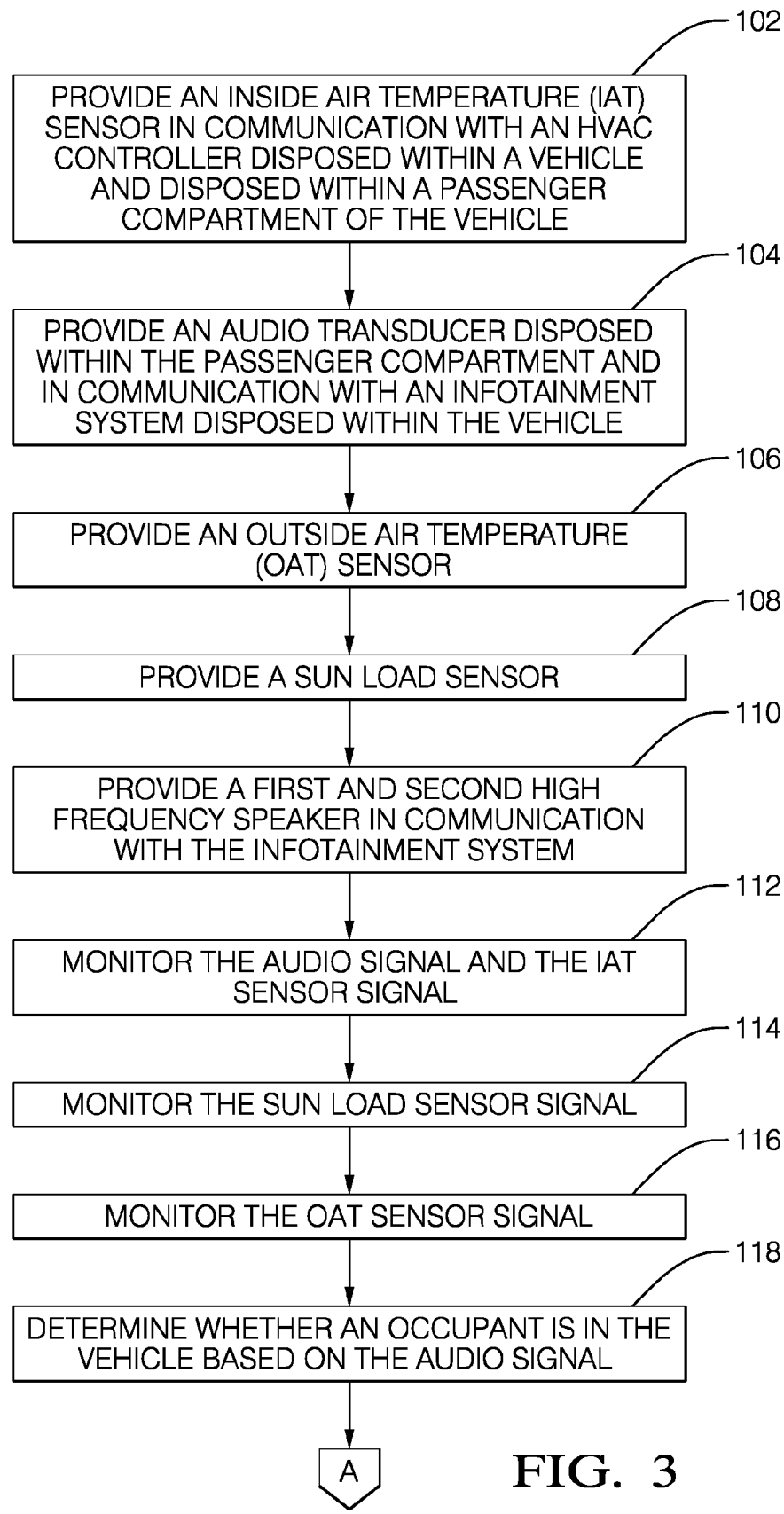
FIG. 3 is a flow chart of a method of taking safety countermeasures in a vehicle having various vehicle controllers according to yet another embodiment.
Figure 3:
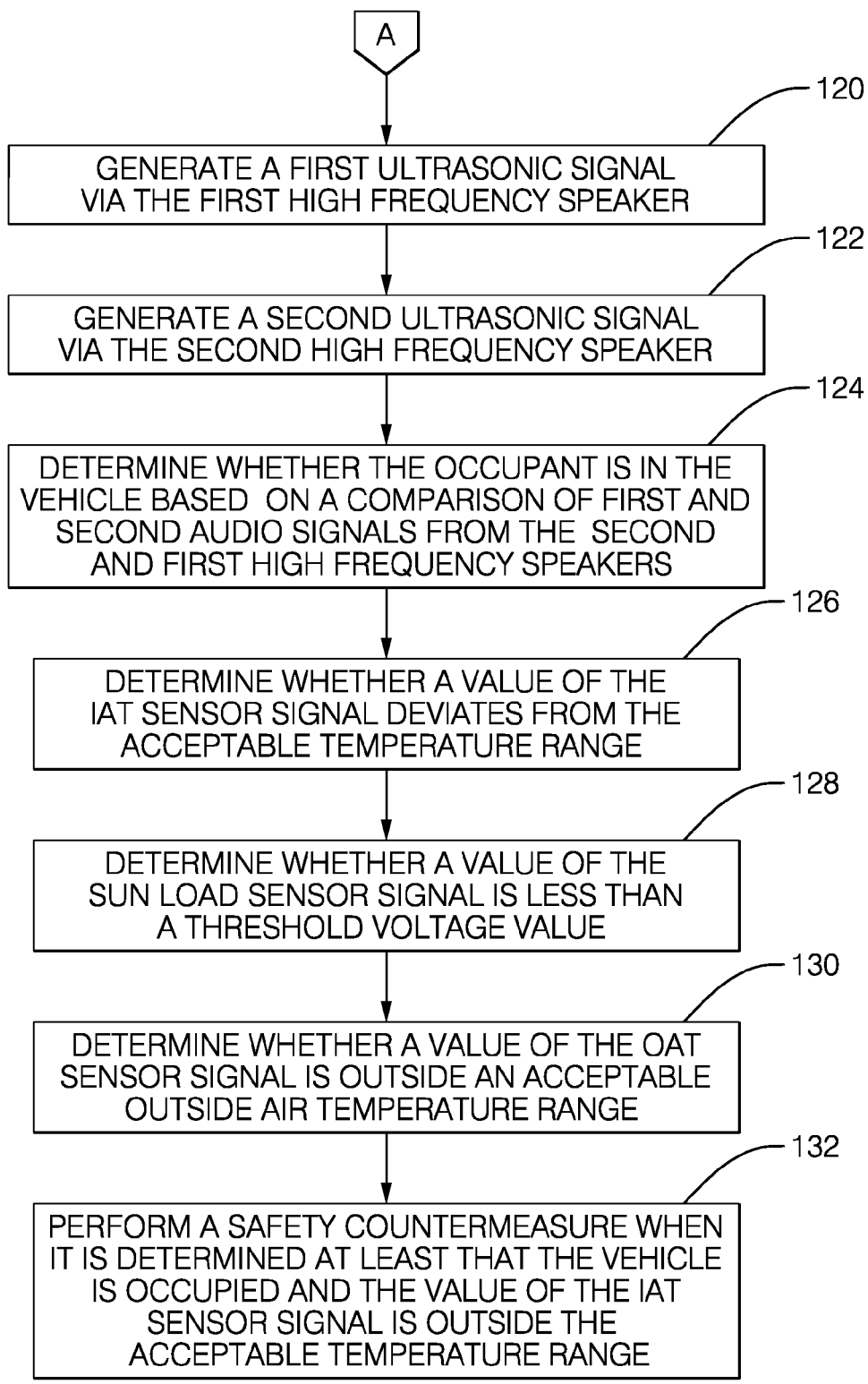

FIG. 3 illustrates a non-limiting example of a method 100 of taking safety countermeasures in a vehicle having various vehicle controllers, wherein an air temperature within a passenger compartment of the vehicle deviates from an acceptable temperature range. The method 100 includes the following steps:

STEP 102, PROVIDE AN INSIDE AIR TEMPERATURE (IAT) SENSOR IN COMMUNICATION WITH AN HVAC CONTROLLER DISPOSED WITHIN A VEHICLE AND DISPOSED WITHIN A PASSENGER COMPARTMENT OF THE VEHICLE, includes disposing an inside air temperature (IAT) sensor 26 within a passenger compartment 14 of a vehicle 16. The IAT sensor 26 is in electronic signal communication with a heating, ventilation, and air conditioning (HVAC) controller 20 that is also disposed within the vehicle 16. The IAT sensor 26 is configured to provide an electronic IAT sensor signal.

STEP 104, PROVIDE AN AUDIO TRANSDUCER DISPOSED WITHIN THE PASSENGER COMPARTMENT AND IN COMMUNICATION WITH AN INFOTAINMENT YSTEM DISPOSED WITHIN THE VEHICLE, includes providing an audio transducer 24 that is disposed within the passenger compartment 14 and which is in electronic signal communication with an infotainment system 22 that is also disposed within the vehicle 16. The audio transducer 24 is configured to provide an electronic audio signal.

The optional STEP 106, PROVIDE AN OUTSIDE AIR TEMPERATURE (OAT) SENSOR, includes providing an OAT sensor 54 that is in electrical signal communication with the HVAC controller 20. The OAT sensor 54 is configured to provide an electronic OAT sensor signal.

The optional STEP 108, PROVIDE A SUN LOAD SENSOR, includes providing a sun load sensor 52 that is in electrical signal communication with the HVAC controller 20. The sun load sensor 52 is configured to provide an electronic sun load sensor signal.

The optional STEP 110, PROVIDE A FIRST AND SECOND HIGH FREQUENCY SPEAKER IN COMMUNICATION WITH THE INFOTAINMENT SYSTEM, includes providing a first and second high frequency speaker pair 24C, 24D that is in electronic signal communication with the infotainment system 22.

STEP 112, MONITOR THE AUDIO SIGNAL AND THE IAT SENSOR SIGNAL, includes monitoring the audio signal from the audio transducer 24 and the value of the IAT sensor signal form the IAT sensor 26.

The optional STEP 114, MONITOR THE SUN LOAD SENSOR SIGNAL, is performed subsequent to step 108 and includes monitoring the value of the sun load sensor signal from the sun load sensor 52.

The optional STEP 116, MONITOR THE OAT SENSOR SIGNAL, is performed subsequent to step 106 and includes monitoring the OAT sensor signal from the OAT sensor 54.

STEP 118, DETERMINE WHETHER AN OCCUPANT IS IN THE VEHICLE BASED ON THE AUDIO SIGNAL, includes monitoring the audio signal from the audio transducer 24 and determining whether an occupant 12 is in the vehicle 16 based on the audio signal. This may be done by analyzing the frequency content and duration of the audio signal.

The optional STEP 120, GENERATE A FIRST ULTRASONIC SIGNAL VIA THE FIRST HIGH FREQUENCY SPEAKER, is performed subsequent to step 110 and includes generating a first ultrasonic signal 56 via the first high frequency speaker 24C while the second high frequency speaker 24D provides a first audio signal based on reception of the first ultrasonic signal 56.

The optional STEP 122, GENERATE A SECOND ULTRASONIC SIGNAL VIA THE SECOND HIGH FREQUENCY SPEAKER, is performed subsequent to step 110 and includes generating a second ultrasonic signal 60 via the second high frequency speaker 24D while the first high frequency speaker 24C provides a second audio signal based on reception of the second ultrasonic signal 60.

The optional STEP 124, DETERMINE WHETHER THE OCCUPANT IS IN THE VEHICLE BASED ON A COMPARISON OF FIRST AND SECOND AUDIO SIGNALS FROM THE SECOND AND FIRST HIGH FREQUENCY SPEAKERS, is performed subsequent to steps 120 & 122 and includes determining whether the occupant 12 is in the vehicle 16 based on a comparison of the first and second audio signals generated by the second and first high frequency speakers 24D, 24C.

STEP 126, DETERMINE WHETHER A VALUE OF THE IAT SENSOR SIGNAL DEVIATES FROM THE ACCEPTABLE TEMPERATURE RANGE, includes determining whether the value of the IAT sensor signal deviates from an acceptable temperature range, e.g. 10° C. to 25° C. The IAT sensor signal may be monitored separately until value of the IAT sensor signal the value of the IAT sensor signal deviates from the acceptable temperature range. Monitoring of the audio signal may begin after it is determined that the value of the IAT sensor signal has deviated from the acceptable temperature range.

The optional STEP 128, DETERMINE WHETHER A VALUE OF THE SUN LOAD SENSOR SIGNAL IS LESS THAN A THRESHOLD VOLTAGE VALUE, is performed subsequent to step 114 and includes determining whether a value of the sun load sensor signal is less than a threshold voltage value.

The optional STEP 130, DETERMINE WHETHER A VALUE OF THE OAT SENSOR SIGNAL IS OUTSIDE AN ACCEPTABLE OUTSIDE AIR TEMPERATURE RANGE, is performed subsequent to step 116 and includes determining whether a value of the OAT sensor signal is outside an acceptable outside air temperature range e.g. 5° C. to 30° C.

STEP 132, PERFORM A SAFETY COUNTERMEASURE WHEN IT IS DETERMINED AT LEAST THAT THE VEHICLE IS OCCUPIED AND THE VALUE OF THE IAT SENSOR SIGNAL IS OUTSIDE THE ACCEPTABLE TEMPERATURE RANGE, includes performing a safety countermeasure when it is determined at least that that the vehicle 16 is occupied and the value of the IAT sensor signal is outside the acceptable temperature range. Additional conditions that may trigger the performance of a safety countermeasure include: determining that an occupant 12 is in the passenger compartment 14 based on a comparison of the reflections 58, 62 of the first and second ultrasonic signals 56, 60 received by the first and second high frequency speakers 24C, 24D, determining that the value of the sun load sensor signal is less than a threshold voltage value, and/or determining that the value of the OAT sensor signal is outside an acceptable outside air temperature range.

Non-limiting examples of safety countermeasures are activating the horn 40, transmitting a wireless signal indicating that an unattended occupant 12 is in the vehicle 16 to a remote receiver, and/or at least partially opening a vehicle window 44. Further non-limiting examples of safety countermeasures are starting and running the engine 50 and then either cooling the passenger compartment 14 if it is determined that the value of the IAT sensor signal is greater than the acceptable temperature range, thereby reducing a temperature in the passenger compartment 14 or alternatively heating the passenger compartment 14 if it is determined that the value of the IAT sensor signal is less than the acceptable temperature range, thereby increasing a temperature in the passenger compartment 14.

Accordingly a safety system 10 that is configured to determine whether a vehicle 16 is occupied, determine whether the temperature within the vehicle 16 is outside of a desired range, and perform a safety countermeasure and a method 100 of taking safety countermeasures in a vehicle 16 having various vehicle controllers when the vehicle 16 is occupied and the temperature within the vehicle 16 is outside of the desired range is provided. The safety system 10 uses components of other vehicle systems that are already installed within the vehicle 16, such as the audio transducers 24A-24D of the infotainment system 22 and the IAT sensor 26 of the HVAC system as inputs determine occupancy and passenger compartment 14 temperature. The safety system 10 also communicates with other existing vehicle controllers to perform safety countermeasures, such as honking the horn 40 or opening windows 44. Reuse of existing vehicle components allows increased with reduced cost compared to the addition of sensors dedicated to the safety system 10. If the safety controller 18 is implemented as a virtual controller, the hardware cost for the safety system 10 may be eliminated.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:
1. A vehicle safety system, comprising:
an inside air temperature (IAT) sensor disposed within a passenger compartment of a vehicle and in communication with a heating, ventilation, and air conditioning (HVAC) controller disposed within said vehicle, said IAT sensor configured to provide a IAT sensor signal;

a first and second high frequency speaker disposed within the passenger compartment and in communication with an infotainment system disposed within said vehicle; and a safety controller in communication with said IAT sensor, said infotainment system, and various vehicle controllers, said safety controller having non-volatile memory containing instructions that, when executed, cause the safety controller to monitor a value of the IAT sensor signal, determine whether the value of the IAT sensor signal deviates from an acceptable temperature range, transmit a first command to the infotainment system to generate a first ultrasonic signal via the first high frequency speaker while the second high frequency speaker provides a first audio signal based on the first ultrasonic signal, transmit a second command to the infotainment system to generate a second ultrasonic signal via the second high frequency speaker while the first high frequency speaker provides a second audio signal based on the second ultrasonic signal, determine whether the occupant is in the vehicle based on a comparison of the first and second audio signals, and transmit a command to at least one of the various vehicle controllers to perform a safety countermeasure when the safety controller determines that the vehicle is occupied and the value of the IAT sensor signal is outside the acceptable temperature range.

2. The vehicle safety system according to claim 1, wherein one of the various vehicle controllers is a vehicle body controller configured to activate a horn disposed within the vehicle and wherein the non-volatile memory further contains instructions that, when executed, cause the safety controller to transmit a command to the vehicle body controller to activate the horn when the safety controller determines that the vehicle is occupied and the value of the IAT sensor signal is outside the acceptable temperature range.

3. The vehicle safety system according to claim 1, wherein one of the various vehicle controllers is an inflatable restraint controller in communication with a driver seat sensor configured to determine if a driver seat is occupied by a driver and wherein the non-volatile memory further contains instructions that, when executed, cause the safety controller to determine whether the driver seat is occupied by the driver based on an output of the inflatable restraint controller and transmit a command to at least one of the various vehicle controllers to perform a safety countermeasure when the safety controller determines that the vehicle is occupied, the driver seat is unoccupied, and the value of the IAT sensor signal is outside the acceptable temperature range.

4. The vehicle safety system according to claim 1, wherein the infotainment system includes telematics capability and wherein the non-volatile memory further contains instructions that, when executed, cause the safety controller to transmit a command to the infotainment system to transmit a wireless signal indicating that an unattended occupant is in the vehicle to a remote receiver when the safety controller determines that the vehicle is occupied and the value of the IAT sensor signal is outside the acceptable temperature range.

5. The vehicle safety system according to claim 4, wherein one of the various vehicle controllers is an inflatable restraint controller in communication with a driver seat sensor configured to determine if a driver seat is occupied by a driver and wherein the non-volatile memory further contains instructions that, when executed, cause the safety controller to determine whether the driver seat is occupied by the driver based on an output of the inflatable restraint controller and transmit a command to the infotainment system to transmit the wireless signal indicating that the unattended occupant is in the vehicle to the remote receiver when the safety controller determines that the vehicle is occupied, the driver seat is unoccupied, and the value of the TAT sensor signal is outside the acceptable temperature range.

6. The vehicle safety system according to claim 1, wherein one of the various vehicle controllers is a window actuator configured to open a vehicle window, said window actuator is in communication with a window controller and wherein the non-volatile memory further contains instructions that, when executed, cause the safety controller to transmit a command to the window controller to at least partially open the vehicle window when the safety controller determines that the vehicle is occupied and the value of the TAT sensor signal is greater than the acceptable temperature range, thereby reducing a temperature in the passenger compartment.

7. The vehicle safety system according to claim 1, wherein one of the various vehicle controllers is an engine controller configured to start and run an engine disposed within the vehicle for a predetermined period of time and wherein the non-volatile memory further contains instructions that, when executed, cause the safety controller to transmit a first command to the engine controller to start the engine and transmit a second command to the HVAC controller to cool the passenger compartment when the safety controller determines that the vehicle is occupied and the value of the TAT sensor signal is greater than the acceptable temperature range, thereby reducing a temperature in the passenger compartment.

8. The vehicle safety system according to claim 1, wherein one of the various vehicle controllers is an engine controller configured to start and run an engine disposed within the vehicle for a predetermined period of time and wherein the non-volatile memory further contains instructions that, when executed, cause the safety controller to transmit a first command to the engine controller to start the engine and transmit a second command to the HVAC controller to heat the passenger compartment when the safety controller determines that the vehicle is occupied and the value of the TAT sensor signal is less than the acceptable temperature range, thereby increasing a temperature in the passenger compartment.

9. The vehicle safety system according to claim 1, further comprising a sun load sensor in communication with the HVAC controller, said sun load sensor configured to provide a sun load sensor signal, wherein the non-volatile memory further contains instructions that, when executed, cause the safety controller to monitor the sun load sensor signal and transmit a command to at least one of the various vehicle controllers to perform a safety countermeasure when the safety controller determines that the vehicle is occupied, the value of the IAT sensor signal is outside the acceptable temperature range, and a value of the sun load sensor signal is less than a threshold voltage value.

10. The vehicle safety system according to claim 1, further comprising an outside air temperature (OAT) sensor in communication with the HVAC controller, said OAT sensor configured to provide an OAT sensor signal, wherein the non-volatile memory further contains instructions that, when executed, cause the safety controller to monitor the OAT sensor signal and transmit a command to at least one of the various vehicle controllers to perform a safety countermeasure when the safety controller determines that the vehicle is occupied, the value of the IAT sensor signal is outside the acceptable temperature range, and a value of the OAT sensor signal is outside an acceptable outside air temperature range.

11. A method of taking safety countermeasures in a vehicle having various vehicle controllers, wherein an air temperature within a passenger compartment of the vehicle deviates from an acceptable temperature range, said method comprising the steps of:
providing an IAT sensor disposed within the passenger compartment of the vehicle and in communication with an HVAC controller disposed within said vehicle, said IAT sensor configured to provide an IAT sensor signal;
providing a first and second high frequency speaker in communication with an infotainment system;
generating a first ultrasonic signal via the first high frequency speaker while the second high frequency speaker provides a first audio signal based on the first ultrasonic signal;
generating a second ultrasonic signal via the second high frequency speaker while the first high frequency speaker provides a second audio signal based on the second ultrasonic signal;
monitoring the TAT sensor signal;
determining whether an occupant is in the vehicle based on a comparison of the first and second audio signals;
determining whether a value of the TAT sensor signal deviates from the acceptable temperature range; and
performing a safety countermeasure when it is determined that the vehicle is occupied and the value of the TAT sensor signal is outside the acceptable temperature range.

12. The method according to claim 11, wherein one of the various vehicle controllers is a vehicle body controller configured to activate a horn disposed within the vehicle and wherein the method further comprises the step of activating the horn when it is determined that the vehicle is occupied and the value of the TAT sensor signal is outside the acceptable temperature range.

13. The method according to claim 11, wherein the infotainment system includes telematics capability and wherein the method further comprises the step of transmitting a wireless signal indicating that an unattended occupant is in the vehicle to a remote receiver when it is determined that the vehicle is occupied and the value of the TAT sensor signal is outside the acceptable temperature range.

14. The method according to claim 11, wherein one of the various vehicle controllers is a window actuator configured to open a vehicle window and said window actuator is in communication with a window controller and wherein the method further comprises the step of at least partially opening the vehicle window via the window actuator when it is determined that the vehicle is occupied and the value of the TAT sensor signal is greater than the acceptable temperature range, thereby reducing a temperature in the passenger compartment.

15. The method according to claim 11, wherein one of the various vehicle controllers is an engine controller configured to start and run an engine disposed within the vehicle for a predetermined period of time and wherein the method further comprises the steps of:
starting and running the engine; and
cooling the passenger compartment when it is determined that the vehicle is occupied and the value of the TAT sensor signal is greater than the acceptable temperature range, thereby reducing a temperature in the passenger compartment.

16. The method according to claim 11, wherein one of the various vehicle controllers is an engine controller configured to start and run an engine disposed within the vehicle for a predetermined period of time and wherein the method further comprises the steps of:
starting and running the engine; and
heating the passenger compartment when it is determined that the vehicle is occupied and the value of the TAT sensor signal is less than the acceptable temperature range, thereby increasing a temperature in the passenger compartment.

17. The method according to claim 11, further comprising the steps of:
providing a sun load sensor in communication with the HVAC controller, said sun load sensor configured to provide a sun load sensor signal;
monitoring the sun load sensor signal;
determining whether a value of the sun load sensor signal is less than a threshold voltage value; and
transmitting a command to at least one of the various vehicle controllers to perform a safety countermeasure when it is determined that the vehicle is occupied, the value of the TAT sensor signal is outside the acceptable temperature range, and the value of the sun load sensor signal is less than the threshold voltage value.

18. The method according to claim 11, further comprising the steps of:
providing an OAT sensor in communication with the HVAC controller, said OAT sensor configured to provide an OAT sensor signal;
monitoring the OAT sensor signal;
determining whether a value of the OAT sensor signal is outside an acceptable outside air temperature range; and
transmitting a command to at least one of the various vehicle controllers to perform a safety countermeasure when it is determined that the vehicle is occupied, the value of the TAT sensor signal is outside the acceptable temperature range, and the value of the OAT sensor signal is outside the acceptable outside air temperature range.

* * * * *